US007051089B1

(12) United States Patent
Johnson et al.

(10) Patent No.: US 7,051,089 B1
(45) Date of Patent: May 23, 2006

(54) TECHNIQUES FOR AUTOMATICALLY DELEGATING ADDRESS SPACES AMONG DYNAMIC HOST CONFIGURATION SERVERS

(75) Inventors: Richard A. Johnson, Santa Barbara, CA (US); Kenneth Kinnear, Jr., Boxborough, MA (US); Mark Stapp, Belmont, MA (US); Jayadev Kumarasamy, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 686 days.

(21) Appl. No.: 10/001,415

(22) Filed: Oct. 24, 2001

(51) Int. Cl.
*G06F 15/177* (2006.01)

(52) U.S. Cl. ...................... 709/220; 709/223
(58) Field of Classification Search ........ 709/220–232, 709/237, 238, 203; 370/389, 351
See application file for complete search history.

(56) References Cited

U.S. PATENT DOCUMENTS

| | | | |
|---|---|---|---|
| 5,742,793 A | | 4/1998 | Sturges et al. |
| 6,009,103 A * | | 12/1999 | Woundy ...................... 709/226 |
| 6,178,455 B1 * | | 1/2001 | Schutte et al. ............... 709/228 |
| 6,219,715 B1 * | | 4/2001 | Ohno et al. .................. 709/245 |
| 6,286,038 B1 * | | 9/2001 | Reichmeyer et al. ........ 709/220 |
| 6,577,628 B1 * | | 6/2003 | Hejza ........................... 370/392 |
| 6,578,074 B1 * | | 6/2003 | Bahlmann .................... 709/220 |
| 6,654,891 B1 * | | 11/2003 | Borsato et al. .............. 713/201 |
| 6,697,360 B1 * | | 2/2004 | Gai et al. ..................... 709/220 |
| 6,775,276 B1 * | | 8/2004 | Beser .......................... 370/389 |
| 6,801,949 B1 * | | 10/2004 | Bruck et al. ................. 709/232 |

OTHER PUBLICATIONS

R. Droms, "Dynamic Host Configuration Protocol", Network Working Group RFC 2131, Mar. 1997, pp. 1-43.*
R. Droms, "Dynamic Host Configuration Protocol", Mar. 1997, pp. 1-45.
S. Alexander et al., "DHCP Options and BOOTP Vendor Extensions", Mar. 1997, pp. 1-34.
K. Taniguchi and T. Nishida, "Subnet Configuration Option Set for DHCP" Network Working Group, Mar. 2, 1998, 14 pgs, Internet Draft, NEC U.S.A.

* cited by examiner

*Primary Examiner*—Jeffrey Pwu
*Assistant Examiner*—Phuoc H. Nguyen
(74) *Attorney, Agent, or Firm*—Hickman Palermo Truong & Becker, LLP

(57) ABSTRACT

Techniques for providing sets of network addresses for dynamically configuring hosts on a network include sending to a first server a first request for a first count of network addresses in a first set of network addresses. A first message indicating the first set of network addresses is received. A second message is received from a second server that requests a second count of network addresses for a second set of network addresses. The second set of network addresses is determined based at least in part on the first set of network addresses and the second count. In response to the second message, a first response indicating the second set is sent to the second server. The techniques allow an administrator to enter available subnets at any DHCP server. The DHCP servers using these techniques then automatically apportion subnets among each other based on the relative usage of the subnets.

26 Claims, 11 Drawing Sheets

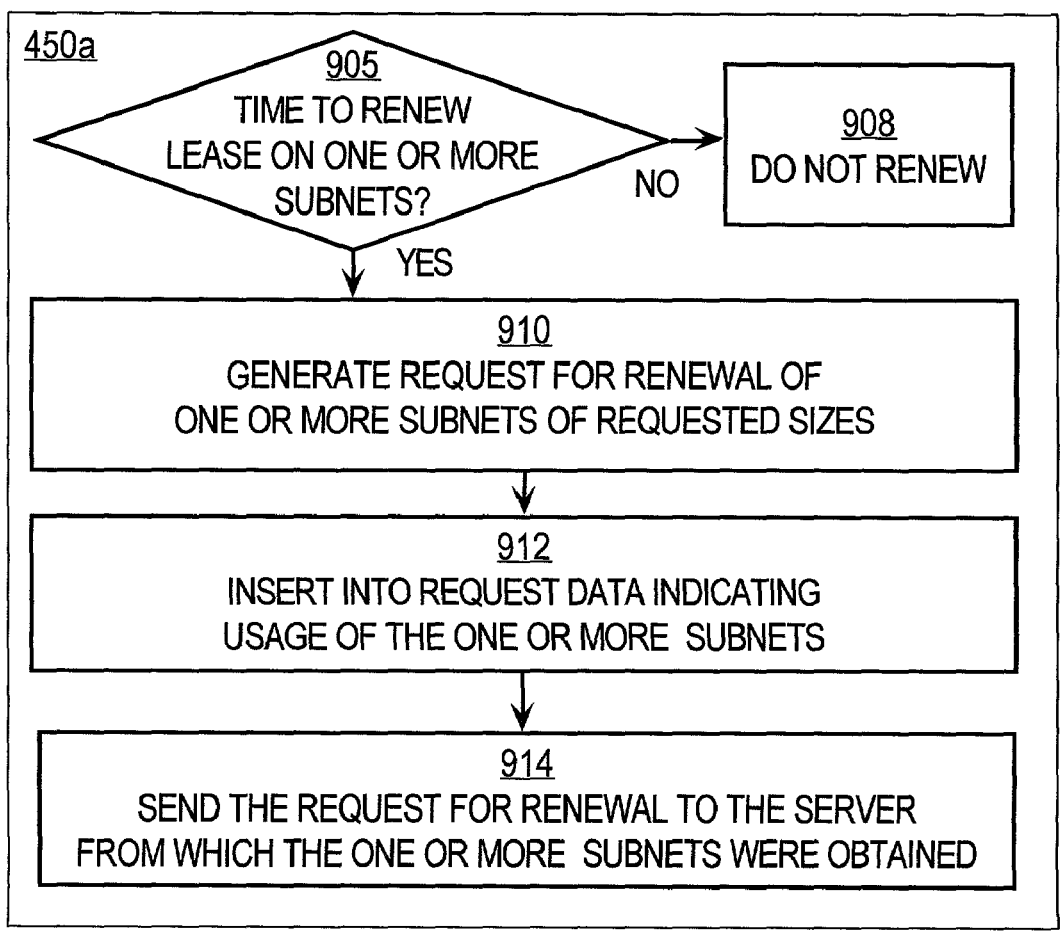

TECHNIQUES FOR AUTOMATICALLY DELEGATING ADDRESS SPACES AMONG DYNAMIC HOST CONFIGURATION SERVERS

FIELD OF INVENTION

The present invention generally relates to dynamic host configuration on a network. The invention relates more specifically to techniques for automatically delegating address spaces among multiple dynamic host configuration servers.

BACKGROUND OF THE INVENTION

A computer network includes computer processors or "hosts" that host software applications that provide or request services, or both. The hosts may be network terminals or end stations that do not perform network traffic routing or forwarding functions. The hosts communicate with each other through network devices, such as switches and routers, sometimes called intermediate devices, which do perform routing and forwarding functions. When a host is added to a network by connecting directly to another host, or indirectly to another host through one or more intermediate devices, the host must be configured for network operations. For example, the newly added host is assigned a logical network address for itself, and a network address for the intermediate device that routes or forwards its traffic, among other configuration information.

Computer networks that employ the Transmission Control Protocol and Internet Protocol (TCP/IP) for sending packets of information between devices on the network are proliferating, and as a result, logical network addresses that are used to locate each device on the network have become scarce. Further, in many local networks with many different computers, the number and location of the computers connected to the network may change regularly. In addition, of the many computers physically connected at one time, only a fraction of the computers are on and operating at one time. Thus one or more hosts are being added and dropped frequently.

A specific context in which this problem arises involves large-scale cable modem networks in which voice and other services are delivered over an Internet Protocol network that uses coaxial cable for communications. In this context, cable modems of end users become active and inactive regularly as users initiate and terminate use of service. In this context, it is wasteful to give every computer a unique and permanent network address. A number of addresses sufficient for the simultaneously operating computers can be shared, and re-assigned as one host drops off the network and another host adds onto the network. Configuring each host is a tedious process to perform manually.

The Dynamic Host Configuration Protocol (DHCP) provides a mechanism through which computers using TCP/IP can obtain network addresses and other configuration information automatically. DHCP is an open standard protocol for dynamic host configuration described in request for comments (RFC) documents numbered 2131 and 2132 available at the time of this writing as rfc2131.html and rfc2132.html, respectively, on the World Wide Web (www) at domain ietf.org. A DHCP server process operates on a DHCP server host that is conveniently located for several hosts on one or more local networks. One or more DHCP server hosts and processes are set up by a system administrator with information to configure the hosts on one or more local networks to reflect the current architecture of those local networks. A DHCP client process operates on each host of the local networks. As used hereinafter, a server refers to the server process and a client refers to the client process unless otherwise indicated to refer to the host or device on which the process executes.

Multiple DHCP servers may serve the same network or portion of the network. The IP addresses available for each network or portion of the network are distributed among the DHCP servers and placed in a data structure at each DHCP, thus forming a pool of addresses that the individual DHCP server may allocate. In conventional systems, a network administrator divides a set or range of network addresses among multiple DHCP servers to reflect the current architecture of the network. Many thousands and even millions of network addresses might be stored in the address pools of the multiple DHCP servers. It is an extremely tedious and error-prone process to manually apportion thousands of network addresses among the address pools of dozens or hundreds of DHCP servers.

One approach to simplify the manual process is to specify a set of contiguous network addresses for a DHCP server as a subnet. A subnet is a base address and a range of addresses above the base address, and therefore is simpler to enter manually as compared to listing each address individually. An IP address consists of 32 bits, often represented as four 8-bit numbers separated by periods, e.g., A.B.C.D, where the letters A, B, C, D each represent one 8-bit number. An 8-bit number can represent values from 0 though 255. In a range of contiguous addresses the leftmost bits are constant and the rightmost change. For example, in a range of network addresses from 20.17.123.000 to 20.17.123.255 the three 8-bit numbers on the left are constant, i.e., the 24 leftmost bits are constant. The leftmost bits that do not change in the range of addresses associated with a particular subnet are withheld or "masked" from processes that operate only on addresses in the subnet. A virtual mask is laid over the leftmost bits. Routers may use the masked portion of the address to direct traffic to physical segments of the network. The number of bits in the mask is the size of the mask. The size of the mask is an indicator of the range in the subnet because the remaining bits are allowed to change within the subnet. For example, the mask of size 24 bits implies a range of 8 bits, from 0–255, for the subnet. The subnet always begins at an address with all zeroes in the unmasked portion.

Several problems occur even with specifying addresses in subnets. First, the apportionment among multiple DHCP servers is still manual, and therefore tedious and error-prone where there are many DHCP servers and many subnets. Second, even if values are entered correctly, the apportionment may not be optimal for the actual distribution of hosts on the network. One DHCP server may be apportioned too large a subnet or too many subnets for the number of hosts that use the portion of the network the DHCP server serves, while another DHCP server may be apportioned too small or too few subnets. When a shortage of addresses arises at one DHCP server, the network administrator manually determines a DHCP server with excess addresses and moves at least some of the excess addresses, perhaps in one or more subnets, to the DHCP server experiencing a shortage. Alternatively the database administrator manually requests additional subnets from a higher authority.

In one approach, a dynamic subnet configuration server (DSC server) is introduced to give out subnets to DHCP servers as requested by the DHCP servers. However, this does not eliminate the problems of conventional DHCP servers. A problem with the DSC server approach is that an administrator must still apportion subnets among the DSC servers if there are multiple DSC servers. Also, DSC servers cannot automatically request additional subnets when all its subnets have been dispersed.

Another problem is that the DSC server does not consider the relative needs of DHCP servers requesting the subnets. For example, two DHCP servers may request renewal of their subnets of mask size 24 bits, yet one of the requesting DHCP servers may be using 45% of the addresses in the subnets while the other is using 90%. If network addresses are scarce, it is more desirable to apportion a smaller subnet (e.g., with a larger mask size) to the first DHCP server than to the second. For example, it is desirable to renew the DHCP server that is making 45% use of its addresses with a subnet of mask size 25 while providing the full subnet of mask size 24 to the DHCP server making use of 90% of its addresses.

Based on the foregoing, there is a clear need for techniques that allow an administrator to enter all available subnets at one location.

There is also a need for techniques that automatically apportion subnets among multiple DHCP servers.

There is also a need for techniques that consider relative usage of the subnets by the DHCP servers while apportioning.

SUMMARY OF THE INVENTION

The foregoing needs, and other needs and objects that will become apparent from the following description, are achieved in the present invention, which comprises, in one aspect, a method for providing sets of network addresses for dynamically configuring hosts on a network. The method includes sending to a first server a first request for a first count of network addresses in a first set of network addresses. A first message indicating the first set of network addresses is received from the first server in response to the first request. A second message is received from a second server. The second message requests a second count of network addresses for a second set of network addresses. The second set of network addresses is determined based at least in part on the first set of network addresses and the second count. In response to the second message, a first response indicating the second set is sent to the second server.

In another aspect of the invention, a method for providing sets of network addresses for dynamically configuring hosts on a network includes receiving a first message from a first server on the network. The first message indicates a first set of network addresses for dynamically configuring hosts on the network and a first time interval for use of the first set. Usage of the first set of network addresses is determined. A second request is sent to the first server before the first time interval expires. The second request is for renewal of use of the first set and includes data indicating the usage of the first set.

In another aspect of the invention, a method for providing sets of network addresses for dynamically configuring hosts on a network includes sending a first message to a first server on the network. The first message indicates a first set of network addresses for dynamically configuring hosts on the network and a first time interval for use of the first set. A request is received from the first server before the first time interval expires. The request is for renewal of use of the first set and includes data indicating the usage of the first set. A second set of network addresses for dynamically configuring hosts on the network is determined based on the first set and the usage of the first set. A second message is sent to the first server. The second message indicates the second set of network addresses.

In another aspect of the invention, a method for providing sets of network addresses for dynamically configuring hosts on a network includes sending a first request to a first server. The first request is for a first count of network addresses for a first set of network addresses. In response to the first request, a first message is received from the first server. The first message includes first data indicating the first set of network addresses and second data indicating that the first server should send a second set of network addresses for dynamically configuring hosts on the network. In response to the data indicating that the first server should send the second set, a second request is sent to the first server. The second request is for the second set of network addresses.

In another aspect of the invention, a method for providing sets of network addresses for dynamically configuring hosts on a network includes receiving a first request from a first server. The first request is for a first count of network addresses for a first set of network addresses. Usage of a second set of network addresses for dynamically configuring hosts on the network is determined. The second set of network addresses is determined based at least in part on the first count and the usage of the first set. A third set of network addresses for dynamically configuring hosts on the network is determined based at least in part on the first set and the usage of the second set. A first message is sent to the first server in response to the first request. The first message includes first data indicating the first set of network addresses and second data indicating that a third set of network addresses should be sent.

In other aspects, the invention encompasses an apparatus, a computer apparatus, and a computer readable medium, including a carrier wave, configured to carry out the foregoing steps.

These techniques allow an administrator to enter available subnets at any DHCP server. The DHCP servers using these techniques then automatically apportion subnets among each other based on the relative usage of the subnets.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9A is a flowchart that illustrates more detailed steps for sending renewal requests for subnets according to an embodiment of one step of the method of FIG. 4.

DETAILED DESCRIPTION OF THE PREFERRED EMBODIMENT

A method and apparatus for providing sets of network addresses for dynamically configuring hosts on a network are with other authentication and authorization mechanisms described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

Operational Context
Structural Overview
Functional Overview
Functional Example
  Discovery
  Acceptance
  Renewal
  Release and Reconfigure
Server Methods
  Obtaining Subnets
  Providing Individual Addresses
  Providing Subnets
  Determining Usage
  Renewing Leases On Subnets
Hardware Overview
Extensions and Alternatives
Operational Context Delegating address space among host configuration servers is described herein in the context of DHCP servers. However, embodiments are not limited to this context. The techniques can be applied in other contexts using other protocols to provide subnets to devices on a network, such as authentication servers implementing the RADIUS protocol and servers for router auto-configuration. An advantage of the embodiments in DHCP servers is that the DHCP message formats are extensible to accommodate the subnet delegation information passed among DHCP servers.

Structural Overview

Figure 1:
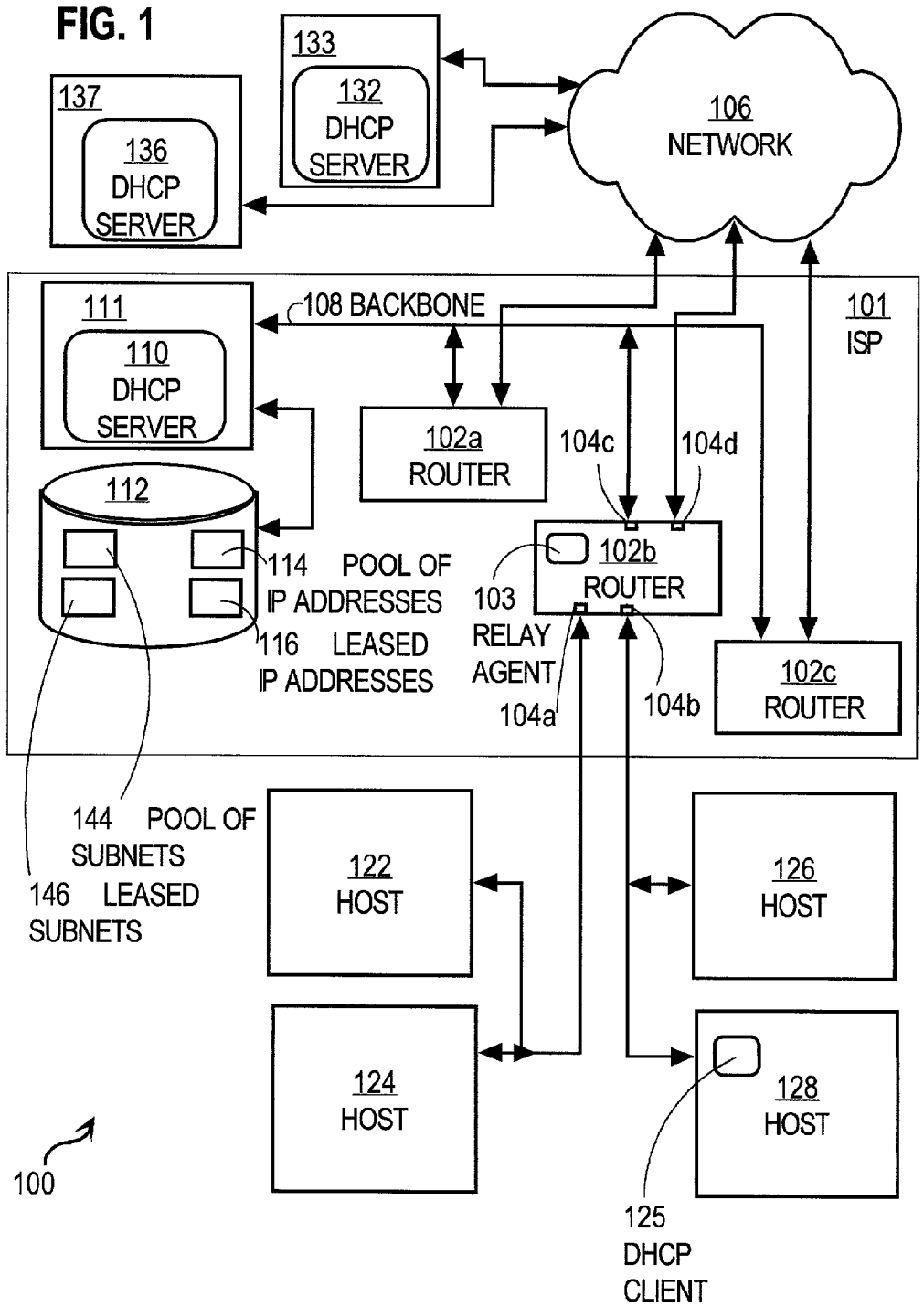
FIG. 1 is a block diagram that illustrates a network in which multiple dynamic host configuration servers automatically apportion address space, according to an embodiment.

FIG. 1 is a block diagram that illustrates a network in which multiple dynamic host configuration servers automatically apportion address space, according to an embodiment.

According to the illustrated embodiment, an Internet service provider (ISP) 101 maintains a set of routers 102a, 102b, 102c, collectively referenced as routers 102, for accepting traffic from one or more local networks, and for placing that traffic onto a network 106, such as the Internet. Traffic comprises the flow of one or more data packets over a network. Each router has multiple interfaces for physical connections to other devices or networks of devices. For example, router 102b includes four interfaces 104a, 104b, 104c, 104d, among others, not shown.

The ISP 101 provides at least one dynamic host configuration protocol (DHCP) server 110 executing on a server device 111 connected to all the routers through a backbone connection 108. Additional DHCP servers 132, 136 on devices 133, 137, respectively, are connected to the network 106. The DHCP servers 110, 132, 136 are modified to perform additional steps according to an embodiment of the present invention.

The server device 111 is connected to a persistent storage device 112 including a database having data structures 114, 116. Data structure 114 stores a pool of Internet protocol (IP) logical network addresses (IP addresses) available for binding to a host with a DHCP client. Data structure 116 stores information about particular configuration data, including particular IP addresses, bound to particular hosts by the DHCP server in response to requests from DHCP clients on those hosts.

The DHCP server 110 also maintains on persistent store 112 data structures 144, 146. Data structure 144 stores a pool of subnets available for lease from the DHCP server, including maximum lease times. Data structure 146 stores information about leased subnets including the servers to which the subnets are leased. As illustrated, data structures 144, 146 are separate from data structures 114, 116. In other embodiments a single data structure includes two or more of the data structures 114, 116, 144, 146.

The DHCP server device 111 is connected to the router 102b through backbone connection 108 and router interface 104c. Hosts 122, 124, 126, 128 are connected directly to router 102b of ISP 101. Hosts 122 and 124 are connected to interface 104a of router 102b. Hosts 126 and 128 are connected to interface 104b of router 102b. The ISP provides configuration information for hosts 122, 124, 126, 128 using DHCP server 110. Hosts have DHCP clients that request a network address and other configuration information for the host from the DHCP servers. For example, host 128 executes DHCP client 125. DHCP relay agents on routers between DHCP clients and DHCP servers facilitate communication of DHCP information between client and server. For example, DHCP relay agent 103 on router 102b facilitates communication between DHCP client 125 and DHCP server 110.

According to an embodiment, a network administrator provides to one of the DHCP servers a list of one or more subnets for configuring hosts on the network 100. The DHCP servers communicate to delegate subnets based on the one or more subnets provided by the network administrator, as described below with reference to FIG. 2 and FIG. 3.

In one embodiment, the network administrator provides each DHCP server with the network addresses of other DHCP hosts on the network so that the DHCP servers may communicate directly to each other with unicasts that specify a destination address. The list of DHCP hosts is stored in a data structure at each DHCP host, not shown. In other embodiments, the DHCP servers broadcast the messages for other DHCP servers and allow the network to propagate the messages to each DHCP host.

Figure 2:
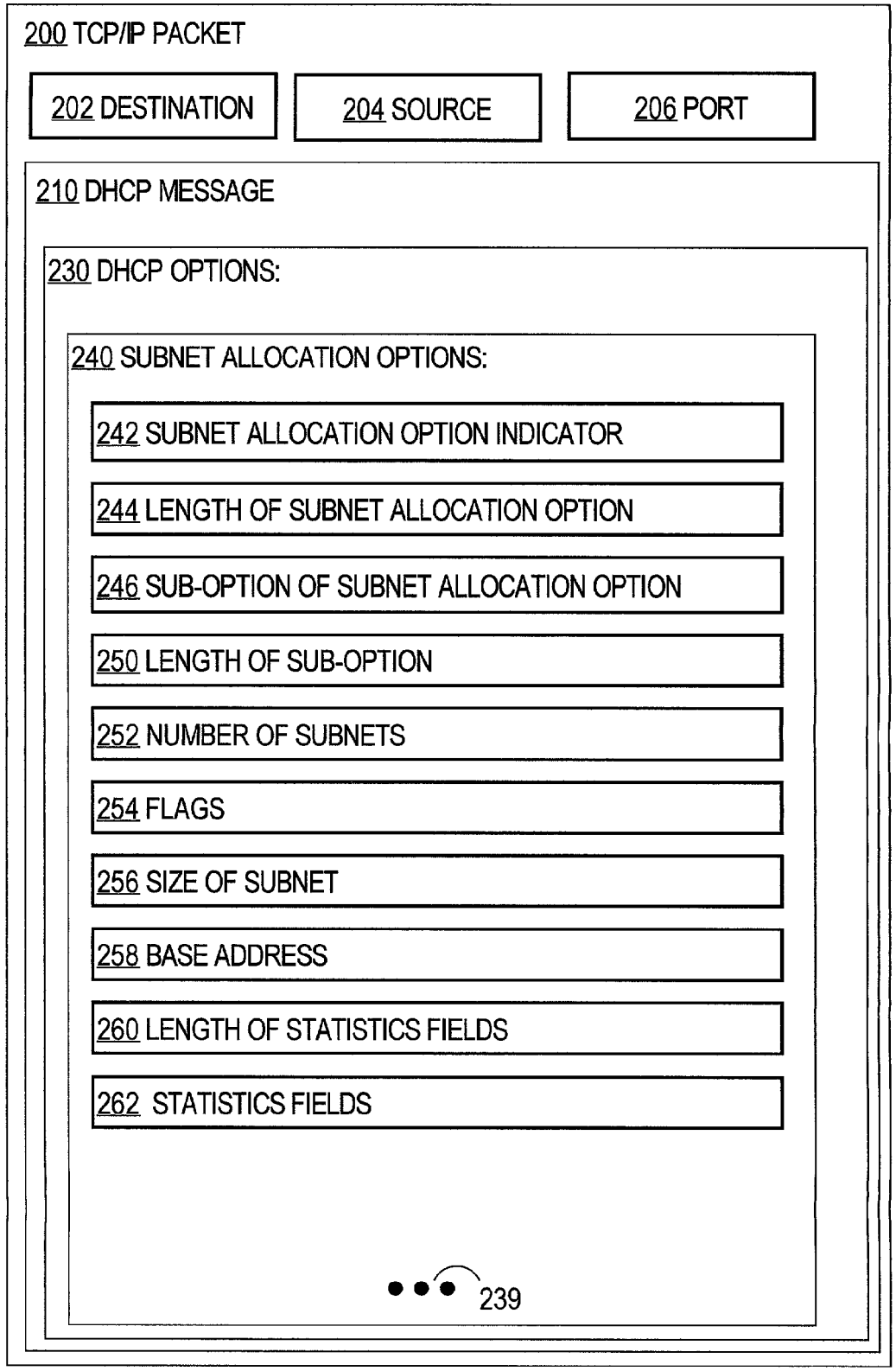
FIG. 2 is a block diagram that illustrates a packet including a message used to delegate address space between dynamic host configuration servers, according to an embodiment.

FIG. 2 is a block diagram that illustrates a packet 200 including a message used to delegate address space between dynamic host configuration servers, according to an embodiment. DHCP messages are included in transport control protocol IP (TCP/IP) data packets. TCP/IP packets include a destination field 202, a source field 204 and a port field 206. The destination field holds data indicating the IP address of the intermediate device or host that is to receive the TCP/IP packet. Routers efficiently transmit TCP/IP packets using hardware configured to interpret the destination address in destination field 202. The source field holds data indicating the IP address of the intermediate device or host that sent the TCP/IP packet. The port field holds data indicating the service requested on the destination device, so that the destination device provides the packet to the appropriate server process executing on the destination device. The port for communications directed to DHCP servers on any device is 67.

The TCP/IP packet includes payload data that is not used by TCP/IP to transfer packets. The illustrated embodiment includes a DHCP message 210 in the data payload. A DHCP message 210 includes a set of fields used in an earlier protocol for passing IP addresses, and a set of fields in a DHCP options portion 230 of the DHCP message.

According to embodiments of the invention, the DHCP options portion includes a subnet allocation option portion 240. The subnet allocation portion 240 is specified according to the DHCP for specifying options in a DHCP message. The subnet allocation option includes an indicator field 242 and a length field 244. The indicator field 242 distinguishes the subnet allocation option portion from other options defined for the DHCP message 210. The length field 242 specifies how many bits comprise the option, so that a process reading the DHCP message can skip past the subnet allocation option.

Several sub-options are defined for the subnet allocation option, to indicate the information in the message. For example, one sub-option is used in messages to request one or more subnets. Another sub-option is used to specify one or more subnets in offers, acknowledgements and renewals, as described in more detail below. Another sub-option is used to specify usage of one or more subnets in renewals, as described in more detail below. The sub-option field 246 holds data indicating the sub-option of the subnet allocation option. Depending on the sub-option, one or more of the following subnet allocation fields are included in the message. The length of sub-option field 252 specifies how many bits comprise the sub-option, so that a process reading the DHCP message can skip past the sub-option.

The number of subnets field 252, if present, holds data that indicates how many subnets are specified in the message. The flags field 254 holds bits to indicate particular situations or interpretations of the other information in the sub-option. The size of subnet field 256 holds data indicating the mask size of a subnet requested, or a subnet provided, depending on the sub-option. The base address field 258 holds data indicating the base address. In some embodiments, the base address field is 32 bits; in other embodiments, the base address field is the mask size.

The sub-option for subnet renewal requests includes fields to report usage statistics on the subnet being renewed. The statistics length field 260 specifies how many bits comprise the statistics portion of the sub-option, so that a process reading the DHCP message can skip past the statistics. The statistics fields 262 hold data indicating usage of the subnet being renewed, as determined by the server making the renewal request.

Functional Overview

Figure 3:
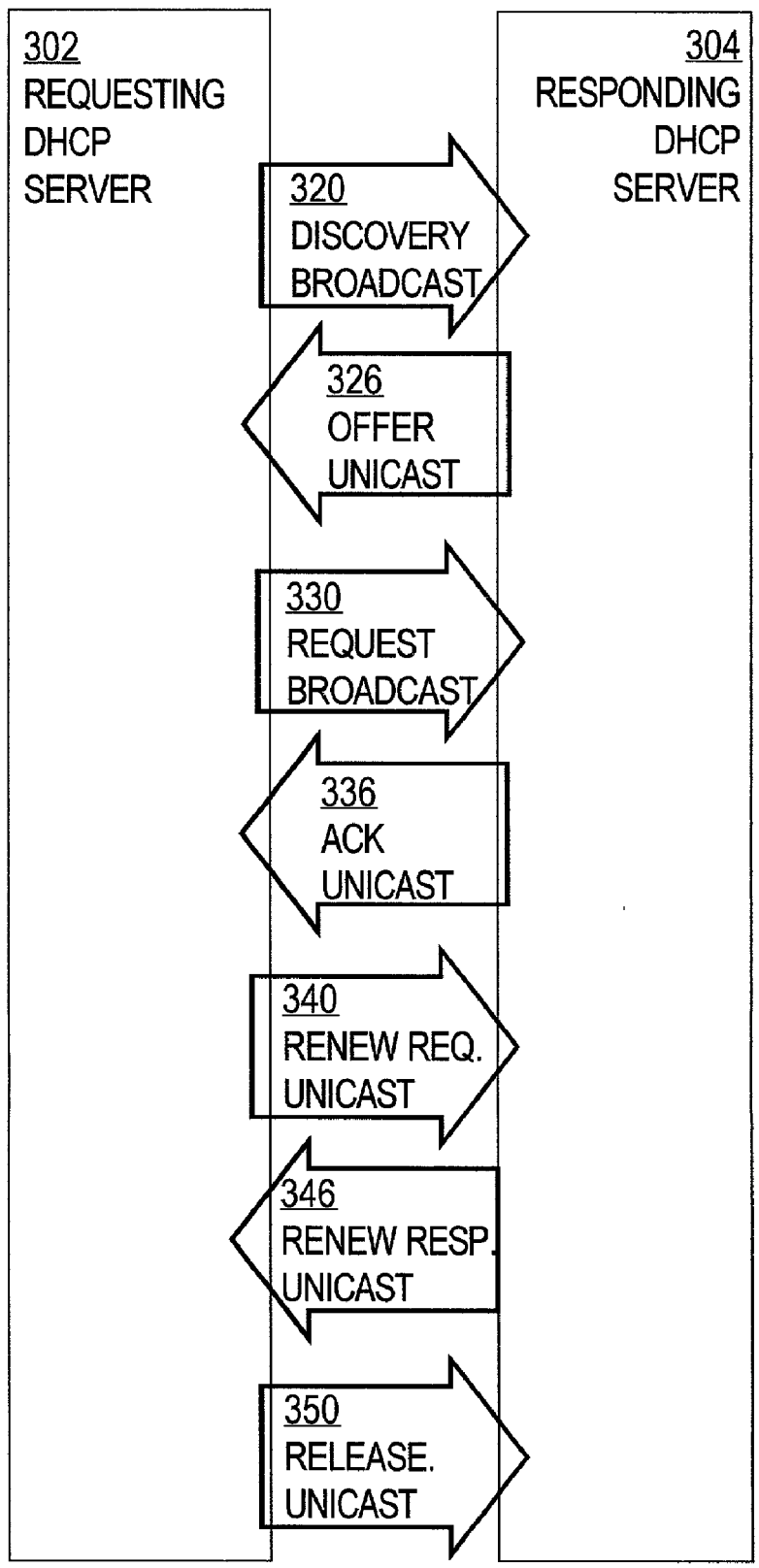
FIG. 3 is a time line diagram that illustrates a sequence of messages passed between two dynamic host configuration servers, according to an embodiment.

FIG. 3 is a time line diagram that illustrates a sequence of messages passed between two dynamic host configuration servers, according to an embodiment. Through messages such as those depicted in FIG. 3, multiple modified DHCP servers delegate subnets among themselves based on usage of addresses in the subnets by the DHCP server to which the subnet is ultimately delegated.

In some embodiments the DHCP servers are configured as multiple peers, in which any DHCP server can request and receive subnets from any other DHCP server. In some embodiments the DHCP servers are configured as a hierarchy, in which a DHCP server lower in the hierarchy requests and receives subnets only from the DHCP server above it in the hierarchy. In other embodiments other arrangements are implemented, including mixtures of peers and hierarchical servers. In many embodiments, the modified DHCP servers are identical, using the same algorithms to make the same decisions about the better use of a subnet among contending DHCP servers. For example, each decision is based on delegating addresses in subnets in proportion to the use made of the addresses in the subnets delegated; however, this delegation approach is not mandatory. A network administrator can enter subnets manually at any peer DHCP server, or, in a hierarchy, at the highest DHCP server that may use the subnet.

The sequence of messages is related to the sequence employed when a DHCP client obtains a single network address, among other configuration information, from a conventional DHCP server; but the messages in FIG. 3 include information in the subnet allocation option and special processing by the modified DHCP servers involved. The sequence includes messages exchanged during discovery of subnets, during acceptance of a subnet by a requesting DHCP server, during renewal of leases on subnets, and during release and reconfiguration of subnets.

Functional Example

The exchange of messages is described in more detail with reference to an example. In the example, DHCP server 110 has unlimited maximum lease times on three subnets as shown in Table 1.

Unlimited lease times might occur if an administrator originally assigned the subnets on DHCP server 110. The information presented in Table 1 may be spread among data structures 144, 146 in FIG. 1. One subnet is used to provide temporary addresses on network segments connected to router 102b through interfaces 104a and 104b. A network segment consists of all devices not separated by intermediate devices, and the one or more intermediate devices contiguous with those devices. For example, in FIG. 1, hosts 126 and 128 and router 102b constitute one network segment. Similarly DHCP server device 111 and routers 102a, 102b, 102c constitute another network segment.

In the example, DHCP server 136 requests a subnet having a mask size of 25 bits.

TABLE 1

Subnets Initially at DHCP Server 110

| Subnet base address | Subnet mask size | Subnet maximum lease time | Subnet Leased for time | Subnet Lessee |
|---|---|---|---|---|
| A.B.C.0 | 24 bits | unlimited | NA | NA |
| Q.R.S.0 | 23 bits | unlimited | NA | NA |
| W.X.Y.Z | 25 bits | unlimited | 1 week | server 110 |

Discovery

At time tA, a DHCP request message 320 of type "DISCOVER" is sent from requesting DHCP server 302 in a broadcast packet. This message is similar to the DHCP DISCOVER type request message for individual network addresses. Any of the DHCP servers 1110, 132, 136 in FIG. 1 may be the requesting server. In the example, DHCP server 136 is the requesting server 320. A broadcast is a TCP/IP packet that is passed to every device on a network segment. DHCP agents at the intermediate devices separating network segments pass the message to a DHCP server in the network. For example, DHCP relay agent 103 on router 102b send the message to DHCP server 110. Eventually the information in the original message is delivered to DHCP servers 132 and 136.

The request 320 includes data in the subnet allocation option that indicate one or more subnets of requested sizes are being requested. Data in the sub-option field 248 indicates that the DHCP message is a "Subnet Request" sub-option of the subnet allocation option. Data in the size of subnet field 256 indicates the size of the subnet requested. For example, a request from DHCP server 136 specifies a mask size of 25 bits in the size of subnet field 256. In some embodiments the Subnet Request message includes data indicating a requested lease time for the subnet. The requested lease time is inserted in an existing field of the DHCP, such as an "IP address lease time" field in some embodiments.

At the responding DHCP server 304, a response 326 of type OFFER is generated based on the contents of message 320 and the usage of the subnets. Any or all of the other DHCP servers 110, 132, 136 in FIG. 1, that are not the requesting server, may be the responding DHCP server 304. For example DHCP servers 110 and 132 may both respond with responses of type OFFER. Subnet usage at the time the request is received is indicated by the contents of the pool of subnets and the table of leased subnets. The subnets in the pool are available and unused. The subnets in the table of leased subnets may be used or unused by the DHCP servers that leased them. In the example, a response is generated based on the contents of data structures 144, 146. A subnet is selected from the pool of subnets in data structure 144, if any subnets are available.

In the example represented by Table 1, a 25 bit subnet is already leased to the local server 110 to use for providing addresses on several network segments, and is not available. The other two subnets are larger than asked for (with smaller mask sizes). In some embodiments, the responding server determines to lease either of these two larger subnets to the requesting server. In other embodiments, the responding server only leases subnets of the requested size or smaller (i.e., with the same or larger mask sizes) in order to preserve scarce subnet resources.

Based on the available subnets and the requested size, the example responding server 110 determines to lease part of subnet A.B.C.0 to the requesting server 136, a part with a mask size of 25 bits. This leaves a second subnet with a mask size of 25 bits, but a base address of A.B.C.128 (128 is 1000000 in binary, so the last seven bits are zeros, as expected for a mask size of 25). After this determination, the subnets at DHCP server 110 are represented by the first three columns of Table 2.

TABLE 2

Subnets at DHCP Server 110 After First Request

| Subnet base address | Subnet mask size | Subnet maximum lease time | Subnet Leased for time | Subnet Lessee |
|---|---|---|---|---|
| A.B.C.0 | 25 bits | unlimited | offered 1 week | offered to server 136 |
| A.B.C.128 | 25 bits | unlimited | A | A |
| Q.R.S.0 | 23 bits | unlimited | A | A |
| W.X.Y.Z | 25 bits | unlimited | 1 week | server 110 |

The responding server also determines a lease time for the subnet requested by the requesting server. For example, the DHCP server 110 determines to lease the new, smaller subnet A.B.C.0 of mask size 25 bits to DHCP server 136 for one week, as shown in Table 2. After a specified period of time, typically half the lease time, DHCP server 136 requests a renewal for the lease of subnet A.B.C.0, if still desired, as described in more detail below.

The responding server generates a message 326 offering the determined subnet to the requesting server. For example DHCP server 110 generates a message 326 offering subnet A.B.C.0 of mask size 25 bits to the DHCP server 136. The message is marked as an offer by inserting the code for an OFFER type DHCP message in the conventional DHCP message type field. The message includes data in the sub-option field 246 indicating subnet information is included. The data indicating the subnet is inserted into the base address field 258 and the size of subnet field 256. For example, data representing base address A.B.C.0 is placed in field 258 and data representing mask size 25 bits is placed in field 256. In one embodiment, the lease time is placed in the conventional DHCP field for IP address lease time, and applies to all subnets included in the message. For example, data indicating one week is placed into the IP address lease time field.

In some embodiments, the responding server determines whether to push one or more additional subnets to the requesting server. Pushing subnets serves to spread subnets more evenly from a central server on which a network administrator placed all the subnets for the network. The responding server determines that one or more additional subnets should be pushed to the requesting server, based on the usage at the responding server. For example, the DHCP server 110 determines that subnets Q.R.S.0 and A.B.C.128 are not both likely to be used for the hosts attached to nodes 102a, 102b, 102c. The DHCP server determines that some or all of one or both of the retained, unused subnets might be better used at DHCP server 136. For example, DHCP server 136 might be able to allocate a subnet to its close neighbor DHCP server 132. To push another subnet to the requesting server, data is inserted into the offer message indicating that the responding server should send an additional subnet to the requesting server. For example, a bit in flags field 254 is set to indicate additional subnets can be obtained from the responding server. In the illustrated example, DHCP server 110 sets a bit in the flags field that indicates additional subnets can be obtained from DHCP server 110 by requesting another subnet.

At time tB after tA, the offer message 326 is sent back to the requesting DHCP server 302.

When a second request is received in response to setting a bit in the flags field indicating additional subnets, the requested size is zero. The responding server determines the additional subnet to send based on the available subnets and usage at the time of the second request. For example, DHCP 110 determines to send half of subnet Q.R.S.0 having a mask of 23 bits. Therefore DHCP server 110 offers new subnet Q.R.S.0 with mask size 24 bits, leaving a new subnet Q.R.T.0 with mask size of 24 bits unused in the pool of subnets, as shown in Table 3.

TABLE 3

Subnets at DHCP Server 110 After Second Request

| Subnet base address | Subnet mask size | Subnet maximum lease time | Subnet Leased for time | Subnet Lessee |
|---|---|---|---|---|
| A.B.C.0 | 25 bits | unlimited | offered 1 week | offered to server 136 |
| A.B.C.128 | 25 bits | unlimited | NA | NA |
| Q.R.S.0 | 24 bits | unlimited | offered 2 weeks | offered to server 136 |
| Q.R.T.0 | 24 bits | unlimited | NA | NA |
| W.X.Y.Z | 25 bits | unlimited | 1 week | server 110 |

Acceptance

At time tC after tB, the requesting DHCP server notifies all offering DHCP servers that one of the offers is accepted by broadcasting request 330. For example, DHCP server 136 broadcasts that the offer from DHCP server 110 is accepted in message 330. The message includes data in the sub-option field 246 indicating subnet information is included and inserts the subnet information from the offer message 326 in the base address field 258 and size field 256. For example, the message 330 from DHCP server 136 includes the subnet specified by base address A.B.C.0 placed in field 258 and mask size 25 placed in field 256.

If the bit in flags field 254 is set to indicate additional subnets can be obtained from the responding server, a second DHCP request message of type DISCOVER is sent from requesting DHCP server 302 in a broadcast packet, largely as described above with reference to message 320. However, in the second request for the additional subnets, the value of the requested size is set to zero to indicate an unspecified size. The responding server is pushing the additional subnet and the requesting server is uninformed of the size of the subnet being pushed at the time of the second request of type DISCOVER.

Upon receipt of the message 330 accepting the offered subnet, the responding server 304 binds the subnet for the lease time to the requesting server 302. For example, the DHCP server 110 binds the subnet to the DHCP server 136 and records the binding in the data structure 146 of leased IP addresses. The other offering servers, if any, reclaim the offered subnets and place them in the pool of subnets, available for offering to another requesting server. For example, if DHCP server 132 also offered a subnet to DHCP server 136, upon receipt of message 330, DHCP server 132 places the offered subnet back in the pool of subnets available for leasing. The requesting server may include less than all the subnets offered to indicate less than all are accepted, but the requesting server may not alter the base address and size of any subnet accepted.

The responding server 304 generates an acknowledgement message 336 of DHCP type "ACK" and unicasts the message to requesting server 302 at time tD after tC. The message includes data in the sub-option field 246 indicating subnet information is included and inserts the subnet information from the offer message 326 in the base address field 258 and size field 256. For example, DHCP server 110 generates a DHCP ACK message 336 and unicasts it to DHCP server 136. The responding server 304 may indicate fewer than all the subnets in the acceptance message 330, but does not change the base address or size of the subnets. The acknowledgement message includes the lease time that applies to all the subnets in the message.

As in the offer message, data may be inserted into the acknowledgement message indicating that the responding server would send an additional subnet to the requesting server. For example, the bit in flags field 254 is set to indicate additional subnets can be obtained from the responding server.

At time tD after tC, the acknowledgement message is sent to the requesting server 302. Upon receipt, the requesting server places the subnets from the acknowledgement message into the pool of subnets on the requesting server 302. The requesting server may use one of the subnets locally to provide individual addresses to hosts on the network segment with the requesting server.

For example, after receiving acknowledgement messages for its first and second requests, DHCP server 136 has subnets in the state represented in Table 4.

TABLE 4

Subnets at DHCP server 136 After Second Acknowledgement

| Subnet base address | Subnet mask size | Subnet maximum lease time | Subnet Leased for time | Subnet Lessee |
|---|---|---|---|---|
| A.B.C.0 | 25 bits | 1 week | 1 week | server 136 |
| Q.R.S.0 | 24 bits | 2 weeks | NA | NA |

The requesting server determines usage of the subnets within the lease time. For example, DHCP server 136 determines usage through the current time, say four days into the lease. DHCP server 136 determines that, of the 128 addresses in subnet A.B.C.000, 51 are currently in use, the maximum used at once has been 74, and no address was found unusable. An address is found unusable for several reasons. For example, a DHCP server might find the address already in use by a host on the network, or a DHCP client might return a DHCP DECLINE message. The currant usage, maximum usage, and number unusable are measures of usage that are easily accumulated in three variables reset to zero at the start of the lease. In other embodiments, other measures of use of the addresses in the subnet are determined. The subnets in the pool of subnets are unused.

Renewal

At time tE after tD, a DHCP request message 340 for renewal of the lease for a subnet is sent from the requesting server 302 in a unicast packet. The renewal request is specified by data in the DHCP message type set to indicate RENEW. Time tE is before the expiration of the lease time for the subnet. For example, tE is four days after the start of the 1-week lease time for subnet A.B.C.0 of mask size 25. A separate renewal message is sent 11 days after the start of the 2-week lease time for subnet Q.R.S.0 of mask size 24.

According to one embodiment, usage information is included in the renewal request. The usage data allows the responding DHCP server 304 to determine whether the leased subnets are delegated to requesting servers in proportion to the use being made of the addresses therein. The responding DHCP server 304 is able to determine, for example, to distribute 20% of the address space to a DHCP server that is binding 20% of the hosts on the network to IP addresses, either directly or by providing subnets to other DHCP servers.

If no usage data is being reported during the renewal, the message includes data in the sub-option field 246 indicating subnet information is included and inserts the subnet information in the base address field 258 and size field 256. For example, one message 340 from DHCP server 136 reports no usage data for the additional subnet. This message includes data in the sub-option field 246 indicating subnet information is included. This message also includes data indicating Q.R.S.0 in the base address field 258 and data indicating mask size 24 bits in the size field 256.

If usage data is being reporting during the renewal, the message includes data in the sub-option field 246 indicating subnet usage is included. The message includes the subnet information in the base address field 258 and size field 256 and the subnet usage information in statistics fields 262. For example, another message 340 from DHCP server 136 reports usage data for the leased subnet and therefore includes data in the sub-option field 246 indicating subnet usage. DHCP server 136 inserts data indicating A.B.C.0 in the base address field 258 and data indicating mask size 25 bits in the size field 256. DHCP server 136 inserts data indicating the current usage of 51, the maximum usage of 74, and the unusable number of 0 in the statistics fields 262.

The responding DHCP server 304 determines a response to the renewal request and sends a renewal response 346 at time tF after tE. The renewal response is either an acknowledgement as indicated by a DHCP message type of ACK or a negating acknowledgement as indicated by a DHCP message type of NAK, as determined by the responding DHCP server 304. In either case, the message includes data in the sub-option field 246 indicating subnet information is included. The message also includes the subnet information in the base address field 258 and size field 256.

The response is message type NAK if the server determines not to renew the lease on the subnet. For example, DHCP server 110 determines not to renew the lease on subnet Q.R.S.0 of mask size 24 bits and sends a message of type NAK. In response to the message of type NAK, the requesting server stops assigning addresses or subnets from the subnet in the NAK message. In some embodiments, the NAK message includes a bit in flags field 254 indicating that the requesting DHCP server 302 should free the subnet as soon as possible by notifying DHCP clients that their IP addresses are no longer valid, terminating the lease prematurely.

The response is message type ACK if the server determines to renew the lease on the subnet. For example, DHCP server 110 determines to renew the lease on subnet A.B.C.0 of mask size 25 bits for two weeks and sends a message of type ACK. The lease time may be the same or different from the preceding lease time. The lease time is inserted in the conventional DHCP field for IP address lease time. In some embodiments, the ACK message includes a bit in flags field 254 indicating that the requesting DHCP server 302 should free the subnet as soon as possible by making no new assignments of IP addresses or subnets from the subnet, and by sending a message of type RELEASE when all addresses in the subnet are unassigned.

Based on the response, the requesting DHCP server 302 updates the pool of subnets and the table of leased subnets. For example, after receiving renewal response messages for subnet Q.R.S.0 of mask size 24 on day 11 from the first start of the first lease (one week into the two week renewal for A.B.C.0), DHCP server 136 has subnets in the state represented in Table 5.

TABLE 5

Subnets at DHCP server 136 After Responses to Two Renewal Requests

| Subnet base address | Subnet mask size | Subnet maximum lease time | Subnet Leased for time | Subnet Lessee |
| --- | --- | --- | --- | --- |
| A.B.C.0 | 25 bits | 1 week | 1 week | server 137 |

Release & Reconfigure

When the requesting DHCP server 302 is finished using a subnet obtained from the responding server 304, the requesting DHCP server 302 sends a message 350 of DHCP message type RELEASE. The message includes data in the sub-option field 246 indicating subnet information is included and inserts the subnet information in the base address field 258 and size field 256. No IP address or subnet of the subnet being released may be in use at the time of the release. The requesting server removes the subnet from the table of leased subnets and from the pool of available subnets.

In some embodiments, the responding DHCP server 304 can accelerate the collection of usage data and re-delegate subnets by issuing a message of DHCP type RECONFIGURE. The message includes data in the sub-option field 246 indicating subnet information is included and inserts the subnet information in the base address field 258 and size field 256 for the subnets to be reconfigured. In response to receiving the message of type RECONFIGURE the requesting DHCP server 302 sends one or more request messages of type RENEW, as described above, for the subnets listed in the message of type RECONFIGURE. In response to the renewal request and based, at least in part, on any usage data contained in the request, the DHCP server 304 can determine to not renew the lease and have the requesting DHCP server 302 free the subnet as soon as possible.

Server Methods

Figure 4:
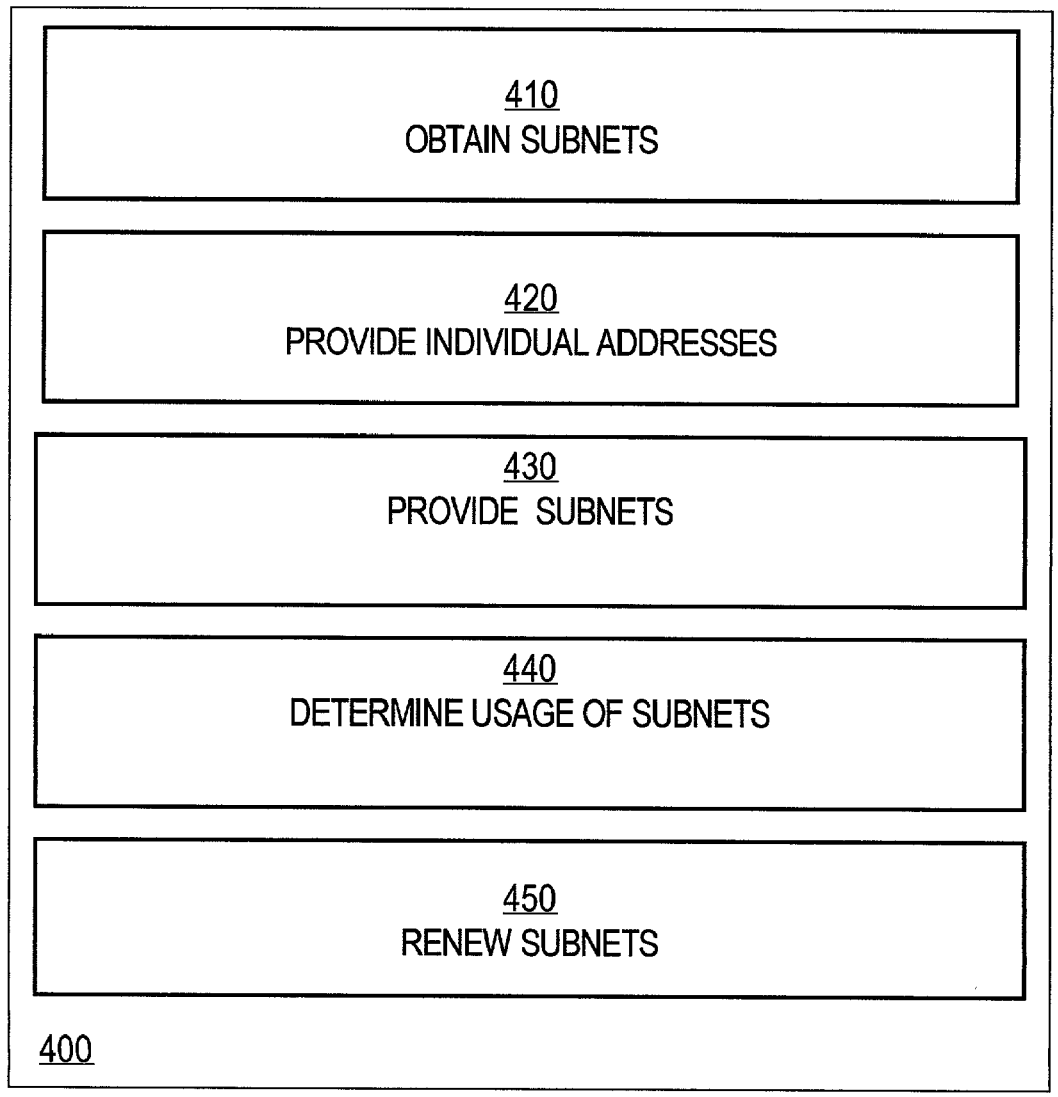
FIG. 4 is a flowchart that illustrates at a high level one embodiment of a method at a server for delegating address space between servers.

FIG. 4 is a flowchart that illustrates at a high level one embodiment 400 of a method at a host configuration server for delegating address space among multiple host configuration servers to support the functions described above. Although the steps are illustrated in FIG. 4 and following figures in a particular order, the steps may be reordered or occur at overlapping times in other embodiments.

In step 410, the host configuration server obtains one or more subnets. Step 410 is described in more detail below, with reference to FIG. 5.

In step 420, the host configuration server provides temporary, individual, network addresses to hosts on the network. Step 420 is described in more detail below, with reference to FIG. 6.

In step 430, the host configuration server provides subnets to other host configuration servers or device, such as routers, that require multiple network addresses on the network. Step 430 is described in more detail below, with reference to FIG. 7.

In step 440, the host configuration server determines usage of subnets. Step 440 is described in more detail below, with reference to FIG. 8.

In step 450, the host configuration server renews the leases on subnets obtained in step 410 or provided in step 430. Step 450 is described in more detail below, with reference to FIG. 9.

Obtaining Subnets

Figure 5:
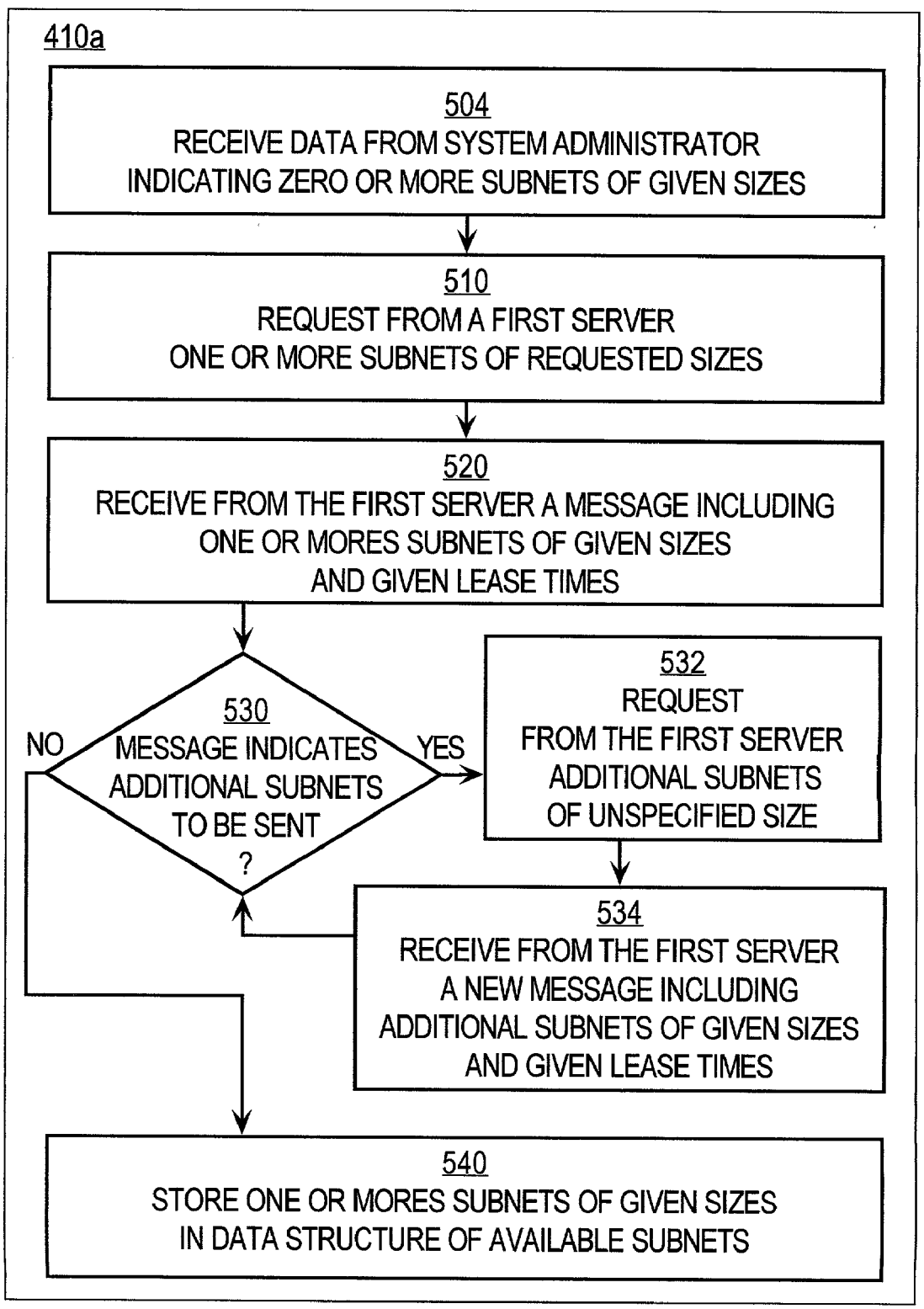
FIG. 5 is a flowchart that illustrates more detailed steps for obtaining subnets according to an embodiment of one step of the method of FIG. 4.

FIG. 5 is a flowchart that illustrates more detailed steps for obtaining subnets according to an embodiment 410a of step 410 of the method of FIG. 4.

In step 504 data is received from a network administrator. The data indicates zero or more subnets by their base addresses and sizes. For example the network administrator provides the data shown in Table 1 on DHCP server 110. The network administrator does not provide any subnets on DHCP server 136. In the illustrated embodiment, the size is indicated as a mask size.

In some embodiments, the data also indicate a maximum lease time. In other embodiments, subnets input by the network administrator without a maximum lease time are considered to have an unlimited maximum lease time. In some embodiments, such as embodiments with a hierarchy of DHCP servers, the data input by the network administrator includes the next highest DHCP server in the hierarchy, if any, and the one or more DHCP servers on the next lowest level of the hierarchy, if any.

In step 510 a message is sent requesting from another host configuration server, a first server, an address space made up of one or more subnets of requested sizes. For example, discovery message 320 is sent requesting a subnet with mask size 25 bits from DHCP server 136 to DHCP server 110.

In step 520 a message is received from the first server that includes data indicating a particular address space made up of one or more subnets of given sizes and given lease times. For example, acknowledgement message 336 is received including the subnet with base address A.B.C.0 and mask size 25 and lease time 1 week.

In step 530 it is determined whether the message includes data that indicates additional subnets can be sent from the first server. For example, it is determined whether the bit is set in the flags field 254 indicating one or more additional subnets should be sent. If so, control passes to steps 532. If the message does not include data that indicates additional subsets, control passes directly to step 540.

In step 532, a message is sent requesting from the first server an address space made up of one or more subnets of unspecified size. For example, discovery message 320 is sent requesting a subnet with mask size 0 bits.

In step 534 a message is received from the first server that includes data indicating a particular address space made up of one or more subnets of given sizes and given lease times. For example, acknowledgement message 336 is received including the subnet with base address Q.R.S.0 and mask size 24 and lease time 1 week.

In step 540, the subnets received are stored in a data structure for a pool of available subnets.

Providing Individual Addresses

Figure 6:
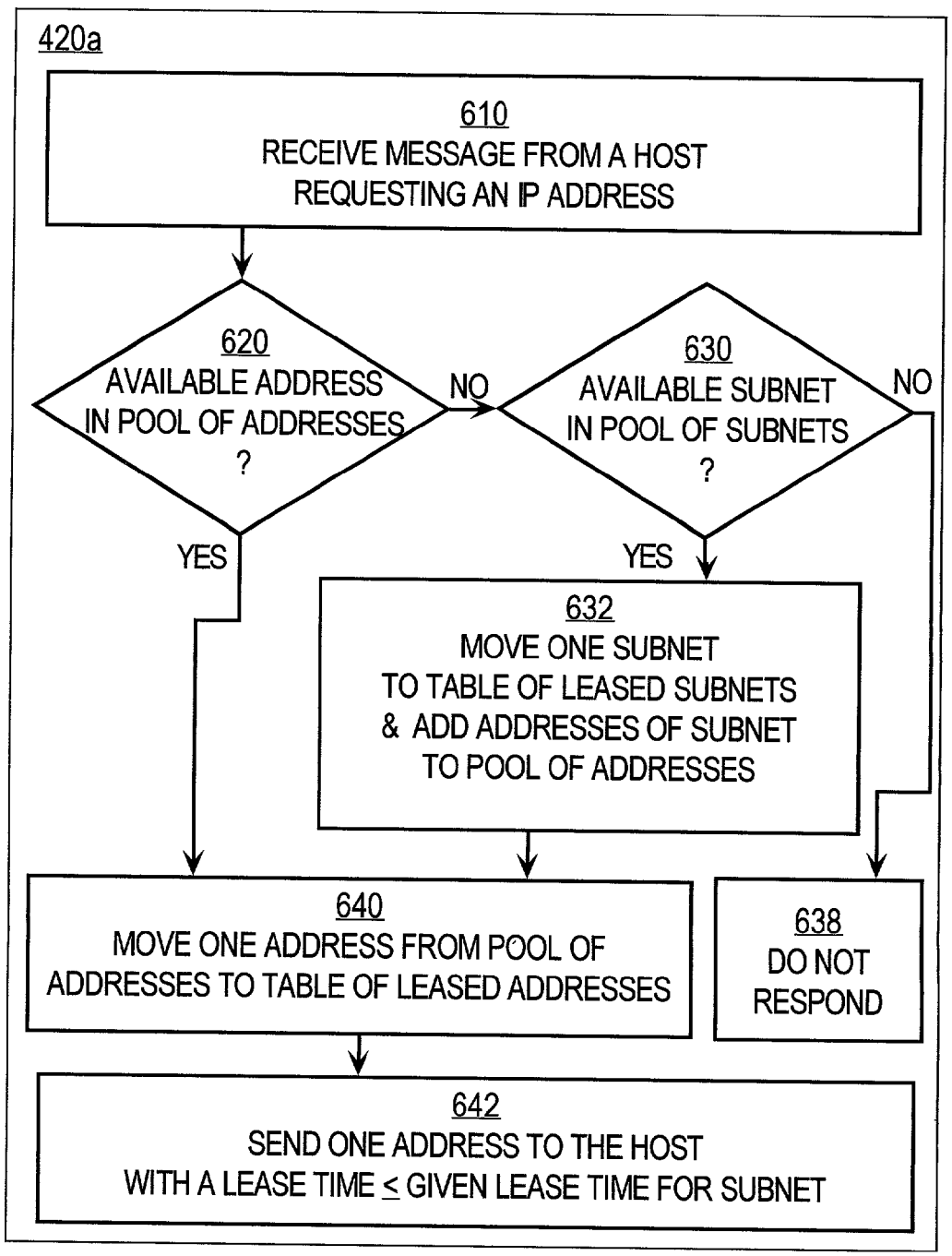
FIG. 6 is a flowchart that illustrates more detailed steps for providing individual addresses to hosts according to an embodiment of one step of the method of FIG. 4.

FIG. 6 is a flowchart that illustrates more detailed steps for providing individual addresses to hosts according to an embodiment 420a of step 420 of the method of FIG. 4.

In step 610 a message is received from a host requesting an IP address. For example, a message is received at DHCP server 110 from DHCP client 125 on host 128 requesting an IP address for host 128.

In step 620 it is determined whether a network address is available in the pool of addresses. For example, it is determined whether any of the 128 addresses in the subnet W.X.Y.Z of mask size 25 bits on DHCP server 110 are in the data structure 114 holding the pool of IP addresses. If so, control passes to step 640. If not, control passes to step 630. For example, if all 128 addresses are in data structure 116 of leased addresses, leaving none in the data structure 114 holding the pool of IP addresses, control passes to step 630.

In step 630 it is determined whether a subnet is available in the pool of subnets. For example, it is determined whether any subnets on DHCP server 110 are in the data structure 144 holding the pool of subnets. If not, control passes to step 638. For example, if all subnets listed in Table 4 are in data structure 146 of leased subnets, leaving none in the data structure 144 holding the pool of subnets, control passes to step 638.

In step 638, the local host configuration server does not respond to the request with an offer of an IP address. In some embodiments, the local host configuration server generates and sends one or more reconfigure messages to servers holding the lease on little used subnets in order to collect some unused subnets for its own use. In some embodiments, such as embodiments with multiple peer DHCP servers, the host configuration server also generates and sends a discovery message 320 to request a new subnet.

If it is determined in step 630 that a subnet is available in the pool of subnets control passes to step 632. For example, if subnets with base addresses A.B.C.128 and Q.R.T.0 listed in Table 4 are in the data structure 144 holding the pool of subnets, control passes to step 632.

In step 632, one subnet from the pool of subnets is moved to the table of leased subnets and the addresses of the moved subnet are added to the pool of network addresses to be used locally by the host configuration server. For example, subnet with base address A.B.C.128 is inserted into the data structure 146 of leased subnets, removed from the data structure 144 holding the pool of subnets (or simply marked as unavailable). The 128 addresses from A.B.C.128 to A.B.C.255 are added to data structure 114 holding the pool of available addresses. Control then passes to step 640.

In step 640 one address from the pool of address is moved to the table of leased addresses. For example, address A.B.C.128 is inserted into the data structure 116 of leased IP addresses, removed from the data structure 114 holding the pool of IP addresses (or simply marked as unavailable). Control then passes to step 642.

In step 642 a message is generated and sent to the requesting host. The message includes the address and a lease time less than or equal to the maximum lease time for the subnet. For example, if the subnet with base address A.B.C.128 is leased to the local server for 1 week, a message is generated including IP address A.B.C.128 and a lease time of 6 days.

Providing Subnets

Figure 7:
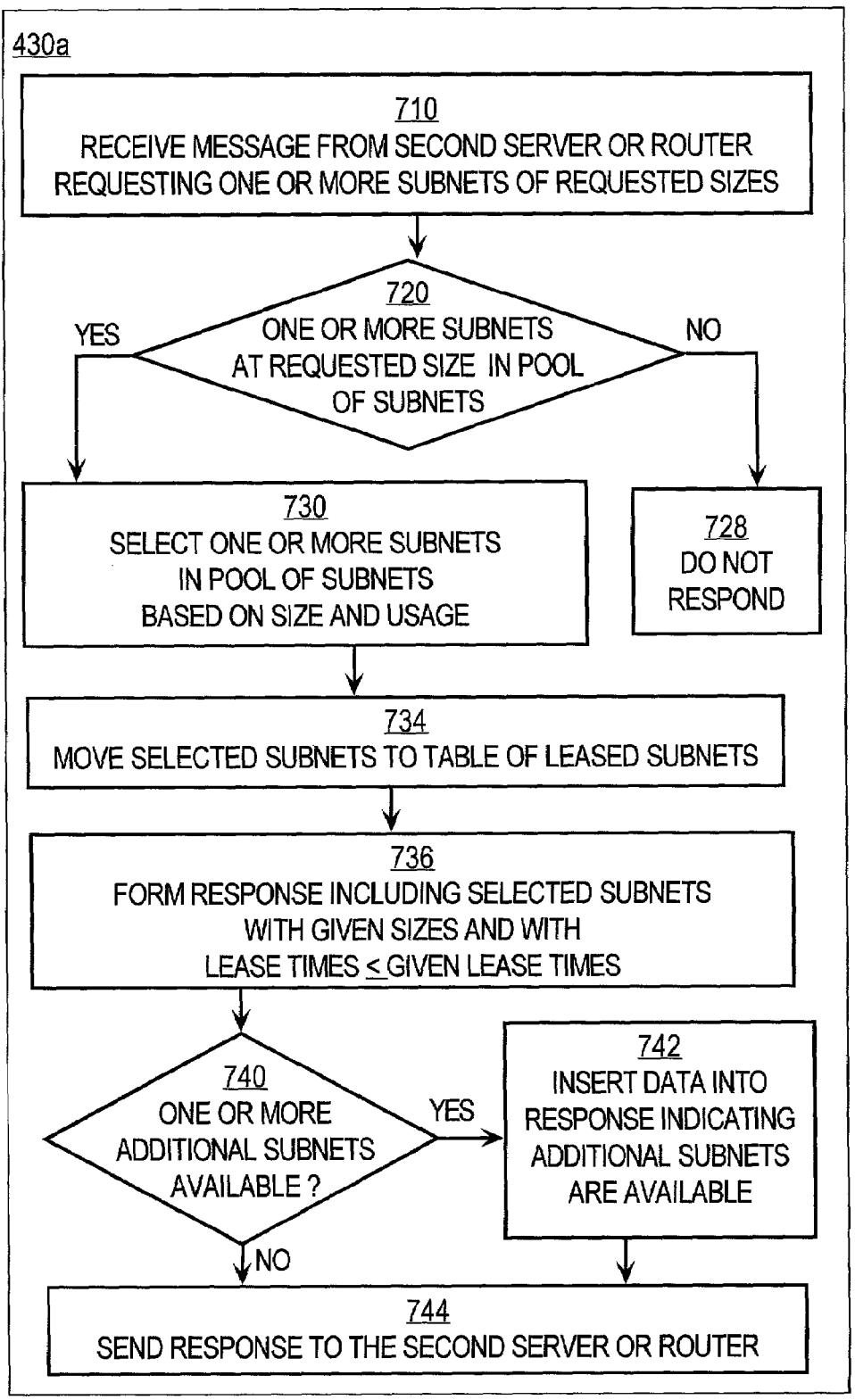
FIG. 7 is a flowchart that illustrates more detailed steps for providing subnets according to an embodiment of one step of the method of FIG. 4.

FIG. 7 is a flowchart that illustrates more detailed steps for providing subnets according to an embodiment 430a of step 430 of the method of FIG. 4.

In step 710 a message is received from a second server requesting one or more subnets of requested sizes. For example, a message 320 is received at DHCP server 110 from DHCP server 136 for a subnet of mask size 25 bits. In some embodiments, a message is received from a device that uses multiple IP addresses, such as a router, for a single subnet of a requested size. For example, a message is received from router 102c for a subnet of mask size 27 bits (32 IP addresses).

In step 730 it is determined whether one or more subnets are available in the pool of subnets of sufficient size to satisfy the request for at least one of the subnets. For example, it is determined whether any subnet of mask size 25 bits or less is in the data structure 144 holding the pool of subnets for DHCP server 110. If not, control passes to step 728. For example, if all subnets listed in Table 4 are in data structure 146 of leased subnets, leaving none in the data structure 144 holding the pool of subnets, control passes to step 728.

In step 728, the host configuration server does not respond to the request with an offer of a subnet. In some embodiments, the host configuration server generates and sends one or more reconfigure messages to servers holding the lease on little used subnets in order to collect some unused subnet delegations. In some embodiments, such as embodiments with multiple peer DHCP servers, or embodiments with a DHCP server at a higher level of a hierarchy, the host configuration server also generates and sends a discovery message 320 to request a new subnet.

If it is determined in step 720 that a subnet is available in the pool of subnets, control passes to step 730. For example, if subnets with base addresses A.B.C.128 and Q.R.T.0 listed in Table 4 are in the data structure 144 holding the pool of subnets, control passes to step 730.

In step 730 one or more subnets are selected from the pool of subnets based on size and usage of the subnets. Selection is based on size in some embodiments. For example, a subnet larger than requested is not provided. Selection is based on usage in some embodiments. For example, no subnet is selected if the usage of subnets already leased is very high and only a few or only small subnets are left in the pool of subnets. As another example, a smaller subnet is provided if use of other subnets by the requesting server is lower than the use of other subnets by other servers. In some embodiments, the table of leased subnets stores usage data for a subnet. The usage data is determined from the table of leased IP addresses on the local server for subnets used locally. The usage data is obtained from the last renewal message, if any, for subnets leased to a different server. Usage data are described in more detail below with reference to FIG. 8 and renewal steps are described in more detail below with reference to FIG. 9.

In step 734, the selected subnets from the pool of subnets are moved to the table of leased subnets. For example, the subnet with base address A.B.C.128 is inserted into the data structure 146 of leased subnets, and removed from the data structure 144 holding the pool of subnets (or simply marked as unavailable). The table of leased subnets stores the subnet base address and mask size and the lease time and the server leased to. For example the data structure 144 includes data indicating base address A.B.C.128, mask size 25 bits, lease time 1 week, and DHCP server 136, among other information. Control then passes to step 736.

If the device making the request is a router or similar device that merely reserves a subnet but does not lease individual IP addresses in response to requests from DHCP clients, the assignment of IP addresses is performed by the local host configuration server, not the device. In this case, step 734 includes adding the addresses of the moved subnet to the pool of network addresses to be used locally by the host configuration server. For example, the 128 addresses from A.B.C.128 to A.B.C.255 are added to data structure 114 holding the pool of available addresses. The addresses are marked reserved for the device in the pool of IP addresses. A group of addresses from the subnet are moved to the table of leased addresses.

For example, addresses A.B.C.128 through A.B.C.139 are inserted into the data structure 116 of leased IP addresses and removed from the data structure 114 holding the pool of IP addresses (or simply marked as unavailable) to mark 12 IP addresses for 12 interfaces on the device. In some embodiments, the message received from the device includes data indicating the requesting device does not make the assignments of individual network addresses in the subnet. For example, a bit is set in the flags field 254 in the request from the device. Using such a flag or other information, a "slave" server can inform a "master" server whether the "slave" server will be assigning addresses from the subnet itself, or whether such requests will be relayed back to the "master" server, i.e., whether the newly assigned subnet is being "reserved" or is actually being "delegated."

In step 736, a response is generated including the selected subnets and given lease times. For example, offer message 326 is generated with data indicating base address A.B.C.128, mask size 25 bits, and lease time 1 week. In another example, acknowledgement message 336 is generated.

In step 740, it is determined whether one or more additional subnets are available from the host configuration server for the second server based on usage. For example, if there are many unused subnets in the pool of subnets and the second server has only obtained a very few subnets, or is making high use of the subnets already leased, then the local host configuration server determines that two more subnets should be sent to the second server.

If it is determined that additional subnets are available for the second server control passes to step 742 to insert data into the response. For example, a bit is set in flags field 254 indicating additional subnets should be sent. In response, the second server sends another message requesting a subnet.

In step 744, the response generated in steps 736 and 742 is sent to the second server or router making the request.

Determining Usage

Figure 8:
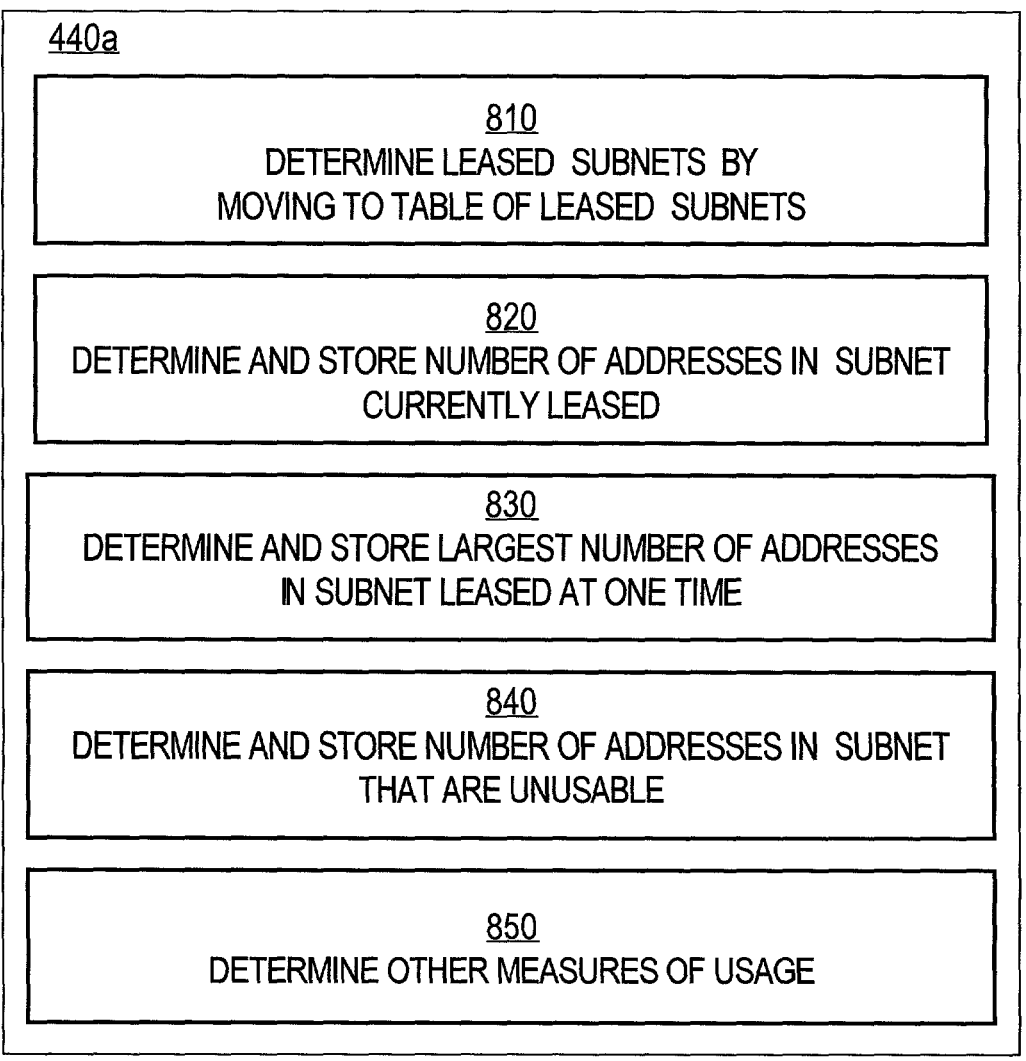
FIG. 8 is a flowchart that illustrates more detailed steps for determining usage of subnets according to an embodiment of one step of the method of FIG. 4.

FIG. 8 is a flowchart that illustrates more detailed steps for determining usage of subnets according to an embodiment 440a of step 440 of the method of FIG. 4.

In step 810, used subnets are determined based on the subnets in the table of leased subnets, such as stored in data structure 146. When a subnet is leased to another server, whether or not any address of the subnet is used by the other server, the subnet is moved to the table of leased subnets. The subnets remaining available in the pool of subnets are unused. The subnets in the table of leased subnets are assumed used unless recorded usage data indicates otherwise. When included, recorded usage data is employed to determine relative use of different subnets. Usage data is determined based on the number of network addresses used in the local table of leased network addresses for subnets used locally. For subnets leased to other servers, the usage data is determined based on the data included in renewal requests.

When a subnet is leased through several servers, the ultimate user generates the usage data and sends the data upon renewal to the providing server, which passes the data upon renewal to its providing server. The data therefore eventually is reported to any server that leased the subnet.

In step 820 the number of addresses in a subnet currently leased is determined and stored in the table of leased subnets.

In step 830 the maximum number of network addresses leased at the same time from the subnet is determined and stored in the table of leased subnets.

In step 840 the number of network addresses of the subnet that are unusable are determined and stored in the table of leased subnets.

In step 850 other measures of usage are determined and stored in the table of leased subnets. For example, the average increase per day of the number of leased network addresses of the subnet is determined and stored.

Renewing Leases on Subnets

FIG. 9A is a flowchart that illustrates more detailed steps for sending renewal requests for subnets according to an embodiment 450a of step 450 of the method of FIG. 4.

In step 905 it is determined whether the time to renew a lease on a subnet has arrived. If not, control passes to step 908, in which no request for renewal is sent. For example, the time to renew is determined to be 60% of the lease time. If it is time to renew a lease, control passes to step 910.

In step 910, a request is generated for renewing one or more subnets. For example renew request message 340 is generated as described above. DHCP server 136 inserts data indicating A.B.C.0 in the base address field 258 and data indicating mask size 25 bits in the size field 256 of message 340.

In step 912, data indicating usage of network addresses in each subnet of the one or more subnets are inserted into the request. For example, DHCP server 136 retrieves usage data stored in a data structure of leased subnets and indicating the current usage of 51, the maximum usage of 74, and the unusable number of 0. DHCP server 136 inserts the usage data in the statistics fields 262 of message 340.

If no usage data is available for the subnet, step 912 is skipped.

In step 914, the message is sent to the server from which the subnet was obtained. For example, DHCP server 136 sends the request for renewal in message 340 to DHCP server 110.

Figure 9B:
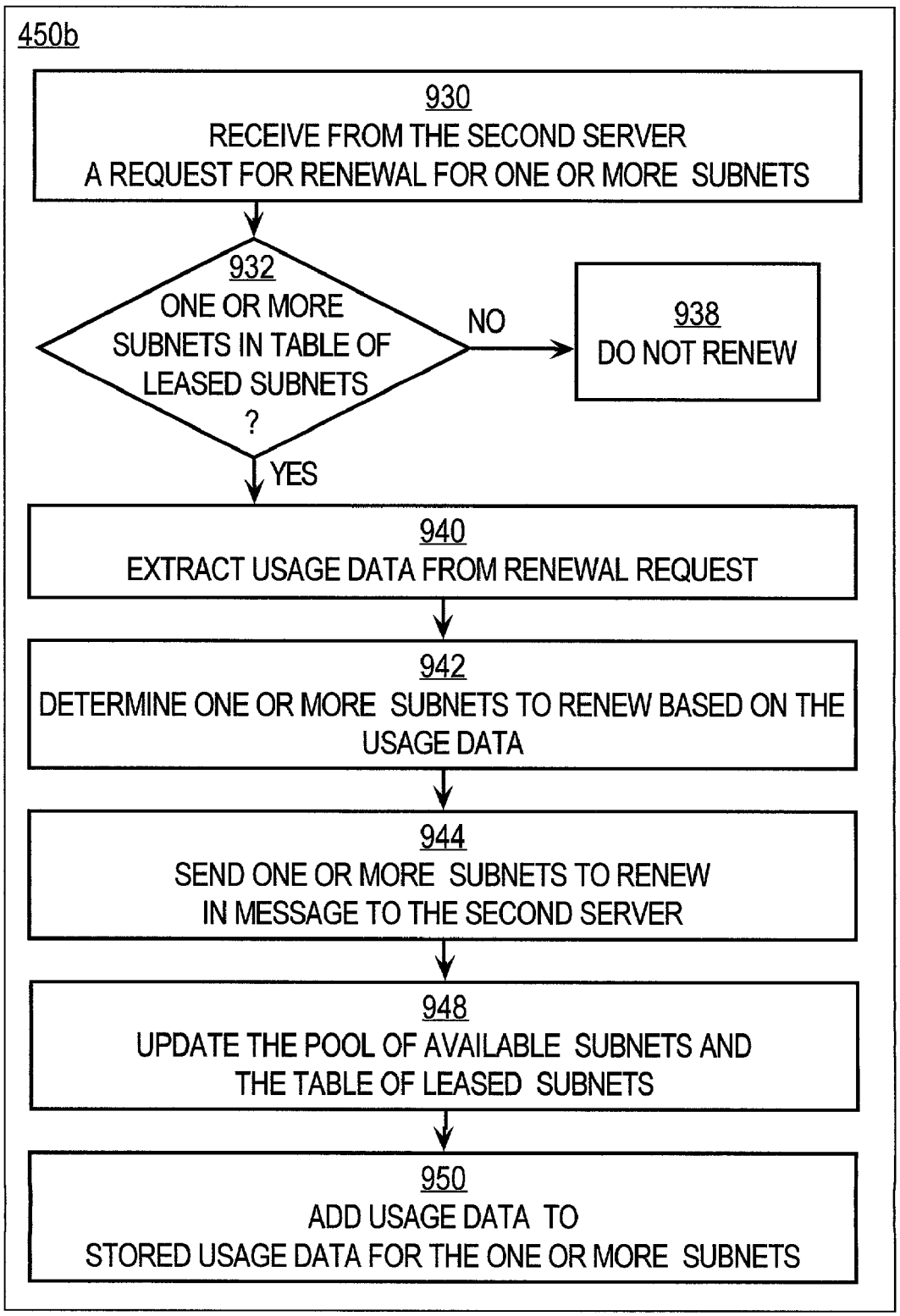
FIG. 9B is a flowchart that illustrates more detailed steps for receiving renewal requests for subnets according to an embodiment of one step of the method of FIG. 4.

FIG. 9B is a flowchart that illustrates more detailed steps for receiving renewal requests for subnets according to an embodiment 450b of step 450 of the method of FIG. 4.

In step 930, a message is received from the second server that requests renewal for one or more subnets. The local server sent the second server a lease on a subnet in step 744 of FIG. 7. For example, DHCP server 110 receives a renewal request from DHCP server 136 as message 340.

In step 932, it is determined whether the subnets in the request were leased by the local server. For example, it is determined whether the subnet is in the table of leased subnets. If the renewal request is sent as broadcast, the local server might receive the request even if the server did not lease the subnet to the second server. If the subnets are not among those leased, control passes to step 938 in which no response is made to the request.

In step 940 usage data, if any, is extracted from the renewal request. For example, data indicating the current usage of 51, the maximum usage of 74, and the unusable number of 0 is extracted from message 340 received at DHCP server 110 from DHCP server 136.

In step 942, one or more subnets to renew are determined based on the usage data. For example, DHCP server 110 determines to renew the subnet at base address of A.B.C.0 based on maximum use greater than half the number of addresses in the subnet and the availability of unused subnets in the pool of subnets at DHCP 110. A smaller subnet, with a larger mask of 26 bits, would be half the size and would not provide sufficient addresses to cover peak use of network addresses. However, if the pool of subnets at DHCP 110 is empty, the DHCP may determine not to renew the subnet. If the subnet is not renewed, the requesting server, DHCP 137, requests a new subnet of the desired size from the servers on the network. DHCP may respond to that request with an offer of the subnet at A.B.C.0 but half the size, i.e., a mask size of 26 bits.

In step 944, the subnet being renewed, if any, is included in a message 346 of acknowledgement and sent to the second server, as described above with reference to FIG. 3.

In step 948, the pool of available subnets and the table of lease subnets are updated to reflect the response to the renewal request. For example, if the renewal is granted for another two weeks by DHCP server 110, the lease time for subnet at base address A.B.C.0 is reset to two weeks. If the renewal is not granted, the subnet at base address A.B.C.0 is removed from the table of leased subnets and added to the pool of subnets.

In step 950, the usage data is added to stored usage data for the one or more subnets. For example, if the usage data is stored in the table of leased subnets and the lease is renewed, the DHCP server 110 stores the data indicating the current usage of 51, the maximum usage of 74, and the unusable number of 0, in usage fields of the data structure 46 holding the table of leased subnets. If the lease is not renewed, the subnet is unused, the subnet does not appear in the table of leased subnets, and the usage data are not stored.

The modified DHCP server of FIG. 4, and embodiments depicted in the subsequent five figures, allow a network administrator to enter subnets at any modified DHCP server on the network, then automatically delegate subnets among the multiple modified DHCP servers based on usage of addresses in the subnets by the modified DHCP server to which the subnet is ultimately delegated.

Hardware Overview

Figure 10:
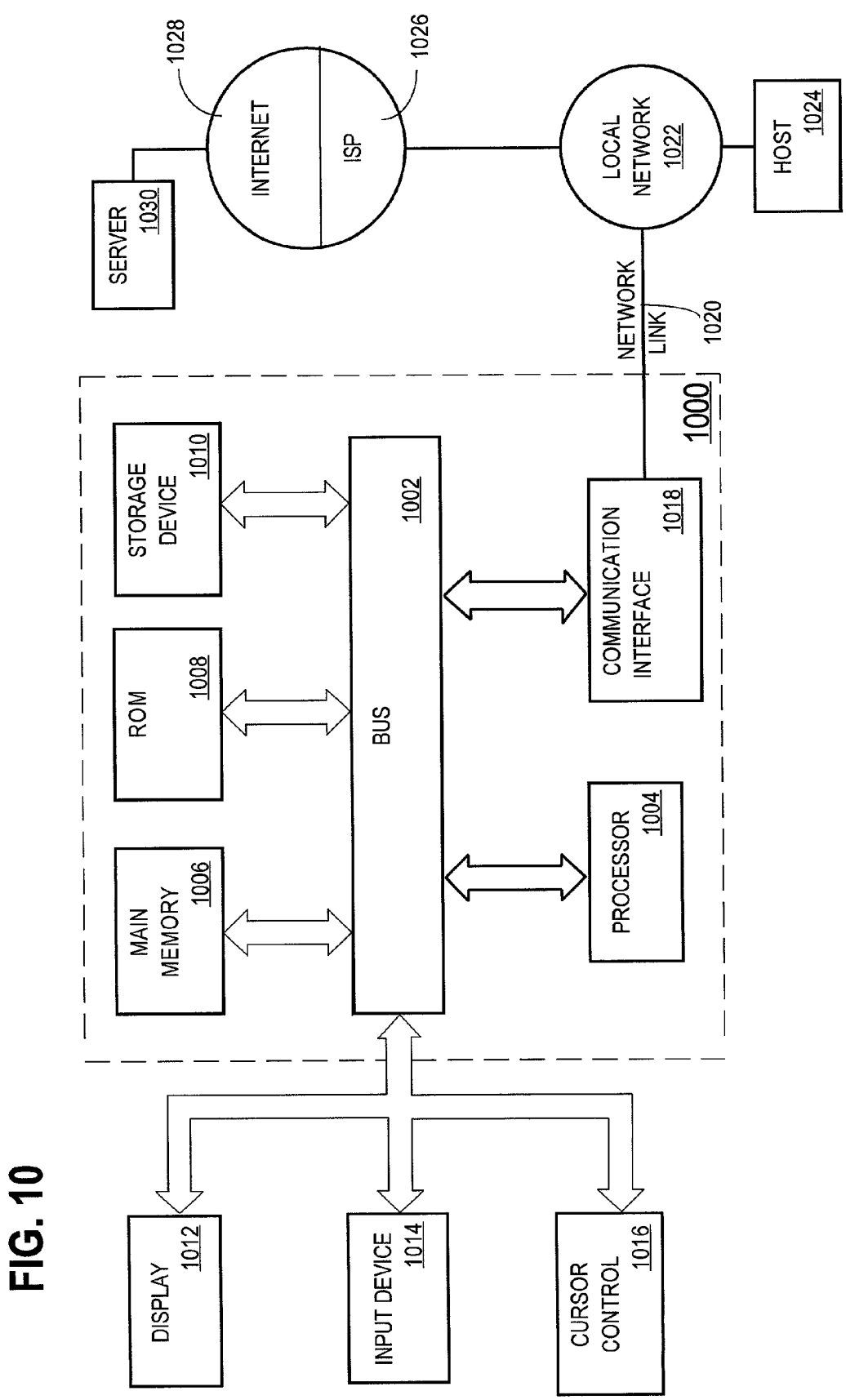
FIG. 10 is a block diagram that illustrates a computer system upon which an embodiment may be implemented.

FIG. 10 is a block diagram that illustrates a computer system 1000 upon which an embodiment may be implemented.

Computer system 1000 includes a bus 1002 or other communication mechanism for communicating information, and a processor 1004 coupled with bus 1002 for processing information. Computer system 1000 also includes a main memory 1006, such as a random access memory ("RAM") or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory ("ROM") 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube ("CRT"), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for providing temporary network addresses. According to one embodiment of the invention, a server for temporary network address services is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector can receive the data carried in the infrared signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network ("ISDN") card or a modem to provide a data communication connection to a corresponding type of telephone line. As another example, communication interface 1018 may be a local area network ("LAN") card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider ("ISP") 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for a DHCP server as described herein.

The received code may be executed by processor 1004 as it is received, and/or stored in storage device 1010, or other non-volatile storage for later execution. In this manner, computer system 1000 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing sets of network addresses for dynamically configuring hosts on a network, the method comprising the computer-implemented steps of:

assigning one or more subnets of a given size to a pool of available subnets;

sending a first request from a first host for a first count of network addresses for a first set of network addresses for dynamically configuring hosts on the network;

determining if there are available network addresses in a pool of available addresses and if not then selecting a first subnet from the pool of available subnets and adding said selected first subnet's network addresses to said pool of available addresses;

receiving a first message indicating the first set of network addresses;

receiving a second message from a second host requesting a second count of network addresses for a second set of network addresses for dynamically configuring hosts on the network;

determining the second set of network addresses based at least in part on the first set of network addresses and the second count;

sending a first response indicating the second set of network addresses;

determining usage of the first set of network addresses wherein the usage comprises a proportion of a number of network addresses used compared to a total number of addresses in the first set;

wherein:

the first message further indicates a first time interval for use of the first set; and the method further comprises sending, before the first time interval expires, a second request for renewal of use of the first set; and the second request includes data indicating the usage of the first set.

2. A method as recited in claim 1, further comprising:
receiving, from a first host on the network, a third message requesting a network address; and
sending, to the first host in response to the second message, a second response offering a first network address based on the first set of network addresses and the second set of network addresses.

3. A method as recited in claim 2, wherein the first set includes the first network address and the second set does not include the first network address.

4. A method as recited in claim 1 further comprising receiving from a network administrator a third message indicating a third set of network addresses for dynamically configuring hosts on the network.

5. A method as recited in claim 1, further comprising reporting the usage of the first set of network addresses.

6. A method as recited in claim 1 further comprising the computer-implemented steps of:
receiving a third message for renewal of use of the second set, the third message including data indicating the usage of the second set,
determining a third set of network addresses for dynamically configuring hosts on the network based on the second set and the usage of the second set wherein the usage is determined in part based on a number of network addresses used in a local table of leased network addresses for subnets used; and
sending a second response indicating the second set of network addresses.

7. A method as recited in claim 1, wherein each set of the first set and the second set is indicated by a base address and a number indicating a range of addresses above the base address.

8. A method as recited in claim 7, wherein the number indicating the range is a mask that indicates a number of most significant bits in the base address that are constant over the range.

9. A method as recited in claim 1, wherein the second set is empty.

10. A method as recited in claim 1, wherein the second set is the same as the first set.

11. A method as recited in claim 1, wherein the hosts on the network include interfaces on a router on the network.

12. A method as recited in claim 1, further comprising:
receiving, from a router on the network, a third message requesting a third count of network addresses for a third set of network addresses for configuring interfaces on the router;
determining the third set of network addresses based at least in part on the first set of network addresses, the second set of network addresses, and the third count; and
sending, to the router in response to the third message, a second response indicating the third set of network addresses.

13. A method as recited in claim 1, wherein:
the first message received includes data indicating that a first server should send a third set of network addresses for dynamically configuring hosts on the network; and
the method further comprises sending, in response to the data indicating that the first server should send the third set, a second request for the third set of network addresses.

14. A method as recited in claim 13, further comprising receiving, from the first server in response to the second request, a third message indicating the third set of network addresses.

15. A method as recited in claim 1, further comprising:
determining that a third set of network addresses should be sent based at least in part on the first set and the second set; and
inserting into the first response data indicating that a third set of network addresses for dynamically configuring hosts on the network should be sent.

16. A method as recited in claim 15, wherein:
the method further comprises determining usage of the first set of network addresses wherein the usage is determined in part based on a number of network addresses used in a local table of leased network addresses for subnets used; and
said step of determining that a third set of network addresses should be sent is based at least in part on the usage of the first set.

17. A method as recited in claim 15, further comprising receiving, in response to the data indicating that the third set of network addresses should be sent, a third message requesting the third set of network addresses.

18. A method provided in claim 1 further comprising the computer-implemented steps of:
receiving, from a first server in response to the first request, a first message including first data indicating the first set of network addresses and second data indicating that the first server should send a second set of network addresses for dynamically configuring hosts on the network; and
sending, to the first server in response to the data indicating that the first server should send the second set, a second request for the second set of network addresses.

19. A method as recited in claim 1, wherein the second message includes data indicating that a requesting device that issued the second message does not make assignments of individual network addresses from among the second set of network addresses such that all future requests for such assignments will be relayed back.

20. A method as recited in claim 1, wherein the second message includes data indicating that a requesting DHCP server should free the second set of network addresses as soon as possible by making no new assignments of addresses or subnets therefrom.

21. A method as recited in claim 1, wherein the second message includes data indicating that a requesting DHCP server should discontinue use of the second set of network addresses when all addresses in the subnet are unassigned.

22. A method of providing sets of network addresses for dynamically configuring hosts on a network, the method comprising the computer-implemented steps of:
receiving, from a first server on the network, a first message indicating a first set of network addresses for dynamically configuring hosts on the network and a first time interval for use of the first set, wherein the first set is selected from a first subnet's available network addresses in a pool of available address;
determining usage of the first set of network addresses wherein the usage is determined in part based on a number of network addresses used in a local table of leased network addresses for subnets used; and
sending, to the first server before the first time interval expires, a second request for renewal of use of the first set,
wherein the second request includes data indicating the usage of the first set.

23. A method of providing sets of network addresses for dynamically configuring hosts on a network, the method comprising the computer-implemented steps of:
  sending, to a first server on the network, a first message indicating a first set of network addresses for dynamically configuring hosts on the network and a first time interval for use of the first set, wherein the first set is selected from a first subnet's available network addresses in a pool of available address;
  receiving, from the first server before the first time interval expires, a request for renewal of use of the first set, the request including data indicating the usage of the first set wherein the usage is determined in part based on a number of network addresses used in the local table of leased network addresses for subnets used;
  determining a second set of network addresses for dynamically configuring hosts on the network based on the first set and the usage of the first set; and
  sending to the first server a second message indicating the second set of network addresses.

24. A computer-readable medium carrying one or more sequences of instructions for providing sets of network addresses for dynamically configuring hosts on a network, which instructions, when executed by one or more processors, cause the one or more processors to carry out the steps of:
  assigning one or more subnets of a given size to a pool of available subnets;
  sending a first request from a first host for a first count of network addresses for a first set of network addresses for dynamically configuring hosts on the network;
  determining if there are available network addresses in a pool of available addresses and if not then selecting a first subnet from the pool of available subnets and adding said selected first subnet's network addresses to said pool of available addresses;
  receiving, in response to the first request, a first message indicating the first set of network addresses;
  receiving a second message from a second host requesting a second count of network addresses for a second set of network addresses for dynamically configuring hosts on the network;
  determining the second set of network addresses based at least in part on the first set of network addresses and the second count;
  sending, in response to the second message, a first response indicating the second set of network addresses;
  determining usage of the first set of network addresses wherein the usage comprises a proportion of a number of network addresses used compared to a total number of addresses in the first set;
  wherein:
  the first message further indicates a first time interval for use of the first set; and
  the method further comprises sending, before the first time interval expires, a second request for renewal of use of the first set; and
  the second request includes data indicating the usage of the first set.

25. An apparatus for providing sets of network addresses for dynamically configuring hosts on a network, comprising:
  means for assigning one or more subnets of a given size to a pool of available subnets;
  means for sending a first request from a first host for a first count of network addresses for a first set of network addresses for dynamically configuring hosts on the network;
  means for determining if there are available network addresses in a pool of available addresses and if not then selecting a first subnet from the pool of available subnets and adding said selected first subnet's network addresses to said pool of available addresses;
  means for receiving, in response to the first request, a first message indicating the first set of network addresses;
  means for receiving a second message from a second host requesting a second count of network addresses for a second set of network addresses for dynamically configuring hosts on the network;
  means for determining the second set of network addresses based at least in part on the first set of network addresses and the second count;
  means for sending, in response to the second message, a first response indicating the second set of network addresses;
  means for determining usage of the first set of network addresses wherein the usage comprises a proportion of a number of network addresses used compared to a total number of addresses in the first set;
  wherein:
  the first message further indicates a first time interval for use of the first set; and
  further comprising means for sending, before the first time interval expires, a second request for renewal of use of the first set; and
  the second request includes data indicating the usage of the first set.

26. An apparatus for providing sets of network addresses for dynamically configuring hosts on a network, comprising:
  a network interface that is coupled to the network for sending and receiving one or more packet flows therefrom;
  a processor; and
  one or more stored sequences of instructions which, when executed by the processor, cause the processor to carry out the steps of:
    assigning one or more subnets of a given size to a pool of available subnets;
    sending a first request from a first host for a first count of network addresses for a first set of network addresses for dynamically configuring hosts on the network;
    determining if there are available network addresses in a pool of available addresses and not any then selecting a first subnet from the pool of available subnets and adding said selected first subnet's network addresses to said pool of available addresses;
    receiving, in response to the first request, a first message indicating the first set of network addresses;
    receiving a second message from a second host requesting a second count of network addresses for a second set of network addresses for dynamically configuring hosts on the network;
    determining the second set of network addresses based at least in part on the first set of network addresses and the second count;
    sending, in response to the second message, a first response indicating the second set of network addresses;

determining usage of the first set of network addresses wherein the usage comprises a proportion of a number of network addresses used compared to a total number of addresses in the first set;

wherein:

the first message further indicates a first time interval for use of the first set; and the sequences of instructions further cause carrying out sending, before the first time interval expires, a second request for renewal of use of the first set; and the second request includes data indicating the usage of the first set.

* * * * *